(12) United States Patent
Kent

(10) Patent No.: US 6,299,717 B1
(45) Date of Patent: Oct. 9, 2001

(54) METHOD OF RENEWING WORN TREAD PORTIONS OF REINFORCED RUBBER TRACKS

(76) Inventor: Peter Jan Kent, Liss Business Centre, Unit3, Station Road, Liss Hampshire, GU33 7AW (GB)

( * ) Notice: Subject to any disclaimer, the term of this patent is extended or adjusted under 35 U.S.C. 154(b) by 0 days.

(21) Appl. No.: 09/331,105

(22) PCT Filed: Dec. 17, 1997

(86) PCT No.: PCT/GB97/03467

§ 371 Date: Jun. 16, 1999

§ 102(e) Date: Jun. 16, 1999

(87) PCT Pub. No.: WO98/26974

PCT Pub. Date: Jun. 25, 1998

(30) Foreign Application Priority Data

Dec. 17, 1996 (GB) .................................... 9626142

(51) Int. Cl.[7] .................................................. B52D 55/32
(52) U.S. Cl. ................................ 156/98; 156/94; 156/96; 156/286
(58) Field of Search ................................ 156/95, 96, 98, 156/94, 286; 305/192, 157, 185

(56) References Cited

U.S. PATENT DOCUMENTS 2,387,802 * 10/1945 Mayne ................................ 305/192
4,600,467 * 7/1986 Perdue .................................. 156/96

FOREIGN PATENT DOCUMENTS 2707536    1/1995   (FR) .

OTHER PUBLICATIONS

International Search Report Apr. 16, 1998.

* cited by examiner

Primary Examiner—Geoffrey L. Knable
(74) Attorney, Agent, or Firm—Fulbright & Jaworski LLP

(57) ABSTRACT

A method of renewing worn tread portions of reinforced rubber tracks which is particularly applicable to the heavy reinforced tracks used on mechanical diggers, mobile cranes and other vehicles, such method involving placing a previously buffed track circumferentially around a correspondingly dimensioned holding ring (4) so that the metal lugs (3) of the track are supported by the holding ring (4); inserting two correspondingly shaped rings (8), one on each side of the row of lugs (3), so as to conform to the space between the track and the holding ring; applying pre-vulcanized tread (5) to the track with a layer of unvulcanized rubber between the tread and the track; surrounding the thus-formed assembly with a generally airtight envelope; creating a vacuum within the envelope (9) and vulcanizing the said unvulcanized rubber so as to bond the tread (5) to the track (1).

15 Claims, 1 Drawing Sheet

METHOD OF RENEWING WORN TREAD PORTIONS OF REINFORCED RUBBER TRACKS

The invention relates to a method of renewing the worn tread portions of reinforced rubber tracks such as are used on certain industrial vehicles including mechanical diggers.

In recent years continuous reinforced rubber tracks have largely replaced segmented metal tracks on self-laying track vehicles which are nowadays used for a wide variety of applications, for example mobile cranes, mechanical diggers, personnel carriers and other vehicles of various types. These rubber tracks have several advantages, one of which is that vehicles using them can run on ordinary roads without destroying the surface of the roads.

Each such track usually comprises a pair of parallel endless treaded portions held apart by transverse sections which may be made of metal and having, on the side away from the treads, a row or rows of metal lugs or "teeth" which, in use, engage sprockets or "wheels" on the vehicle whereby the tracks are moved.

A major disadvantage of the rubber tracks is that their tread portions wear out relatively quickly. In practice, it is found that with a range of equipment the tracks generally have to be replaced after an average period of about two years. They are expensive items and the frequency of replacement is a significant disadvantage to the user.

Hitherto it has been impractical to prolong the lives of these tracks by renewing their tread portions, as it was expected that the labour and complexity of applying tread portions to old tracks, and the inadequate retentiveness of the new tread portions on the old tracks, would not make this worthwhile.

The present invention overcomes the disadvantages of the prior art and makes it possible to provide an effective, efficient and relatively inexpensive method of prolonging the lives of reinforced rubber tracks by renewing their tread portions.

The method of the invention involves placing a previously buffed track circumferentially around a correspondingly dimensioned holding ring so that the metal lugs of the track are supported by the holding ring; inserting two correspondingly shaped rings, one on each side of the row of lugs, so as to conform to the space between the track and the holding ring; applying pre-vulcanized tread to the track with a layer of unvulcanised rubber between the tread and the track; surrounding the thus-formed assembly with a generally airtight envelope; creating a vacuum within the envelope and vulcanizing the said unvulcanized rubber so as to bond the tread to the track.

In a preferred embodiment the holding ring is circular.

The said tread applied to the buffed track may, for example, consist of suitably shaped individual tread portions, or may consist of a continuous circular tread strip formed with appropriate protrusions.

The metal lugs on the rear side of the track, which are provided by the manufacturers so that the track can engage the metal sprockets or "wheels" of track laying vehicles, prevent a proper vacuum being formed unless the special above-mentioned rings are inserted so as to conform to the space between the underside of the track and the outer circumference of the holding ring or "mandrel".

These rings are desirably formed of a flexible material, for example rubber, and are desirably profiled so as to conform precisely to the spaces which they are to fill.

By means of the invention, air or other gases can be completely excluded during the bonding of the vulcanizing process, which has been discovered to be essential in order to ensure correct and strong bonding.

The invention enables an effective vacuum to be maintained which can help the tread to be maintained under pressure against the track during the vulcanizing step.

By means of the invention the relatively simple and less expensive tread portion of a track can be renewed, while conserving the original complex and expensive reinforced portion of the track.

The tracks under consideration are often of considerable size and weight, and it is extremely difficult to "repair" them otherwise than by the method of the invention.

In one embodiment, the holding ring or "mandrel" is provided by the buffed surface of a lorry tire whose outer circumference is the same in length as the inner perimeter of the track.

In practice, the mandrel may be positioned horizontally, but it may be more practical to position it vertically.

In a preferred embodiment, the pre-vulcanized tread is applied to the track in the form of a pair of parallel spaced rings of rubber comprising appropriate tread protuberances, the treaded rings being joined by a flat strip.

Alternatively or additionally, a circumferential band of suitable material may be placed externally around the partially hollowed centre area of the buffed worn track, prior to insertion of the complete assembly into a suitable pressure chamber such as is used to bond new prevulcanized treads to prepared worn tires.

Again, the purpose is to ensure good airtight sealing and facilitate the formation of an effective vacuum and strong bonding of the renewed treads to the track.

The invention is illustrated in the accompanying drawings in which.

Figure 1:
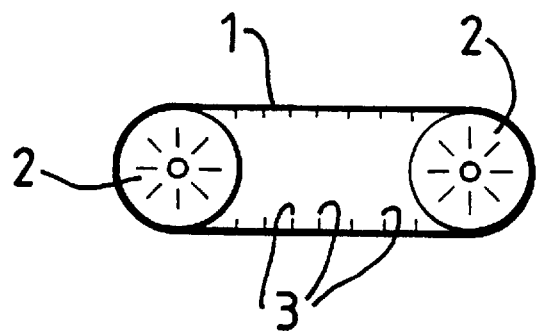
FIG. 1 is a diagrammatic side view of a reinforced rubber track carried on a pair of sprockets.

In FIG. 1, a reinforced rubber track 1 is carried on a pair of sprockets 2 which form part of a vehicle (not shown) which as another pair of sprockets and another reinforced track whereby the vehicle may be driven over the ground. The track 1 has on its inside surface rows of lugs 3 which mesh with corresponding apertures (not shown) in the sprockets 2. This is all in accordance with conventional practice.

Figure 2:
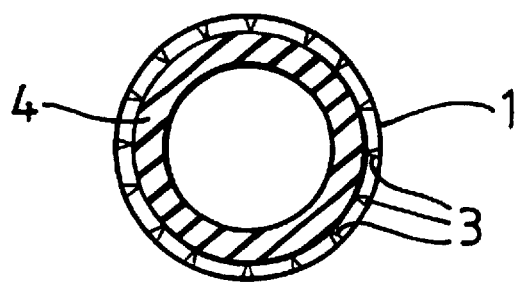
FIG. 2 is a diagrammatic side view of the track of FIG. 1 placed over a holding ring in preparation for renewal of the tread portions.

In FIG. 2, the track 1 has been placed circumferentially round a circular holding ring 4, for example a suitably buffed lorry tire whose diameter is such that the track fits snugly round it with the lugs 3 in contact with the surface of the holding ring 4 so that the main body of the track 1 is spaced from the surface of the holding ring 4 by a distance equal to the length of the lugs 3.

Figure 3:
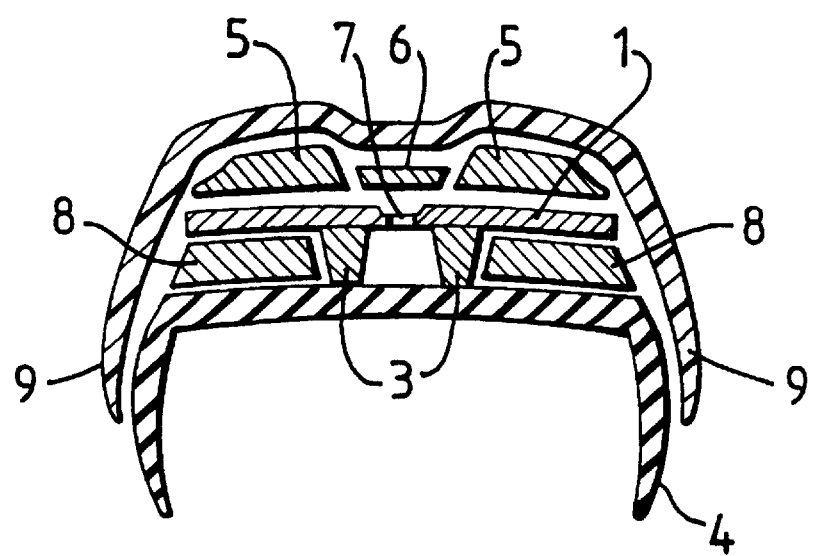
FIG. 3 is a partial cross-section of the track on the holding ring during the method of the invention.

FIG. 3 illustrates a further stage in the process. As in FIG. 2, the track 1 lies around the holding ring 4 with the lugs 3 in contact with the holding ring 4. Over the previously buffed worn surface of the track 1 are placed two parallel tread portions 5. A circumferential band 6 is located between the tread portions 5 so as to cover apertures 7 which conventionally exist along the central line of tracks of this kind. Alternatively or in addition, a thin strip of flexible material such as rubber may be formed integrally with the two tread portions 5 and 6 thus sealing aperture 7. Between the buffed surface of track 1 and tread portions 5 is a layer of unvulcanized rubber (not shown).

Rings 8, conformed as described below, are located on each side of the rows of lugs 3. Over the whole is disposed an airtight envelope 9 of flexible material, having means such as a valve (not shown) for extraction of air and any other gases from the space between the holding ring 4 and the envelope 9.

Two rings 8, preferably of flexible material such as rubber, are disposed on either side of the rows of lugs 3. Their cross-sectional shape is such a that they fill the spaces bounded by the track 1, the lugs 3, the holding ring 4, and the envelope 9.

In use, the assembly thus created is subjected to vacuum-forming means so as to exhaust as far as possible the space bounded by the envelope 1 and the holding ring 4, and the assembly is subjected to heat and pressure whereby the layer of unvulcanized rubber is vulcanized and the tread portions 5 are thus caused to adhere firmly to the track 1.

By this means there is produced a re-treaded track.

What is claimed is:

1. A method of renewing worn tread portions of reinforced rubber tracks comprising placing a previously buffed track circumferentially around a correspondingly dimensioned holding ring so that a row of metal lugs of the track are supported by the holding ring; inserting two correspondingly shaped rings, one on each side of the row of metal lugs, so as to conform to the space between the track and the holding ring; applying pre-vulcanized tread to the track with a layer of unvulcanized rubber between the tread and the track; surrounding the thus-formed assembly with a generally airtight envelope; creating a vacuum within the envelope and vulcanizing the said unvulcanized rubber so as to bond the tread to the track.

2. A method according to claim 1 in which the tread applied to the track comprises shaped individual tread portions.

3. A method according to claim 1 in which the tread applied to the track consists of a continuous circular tread strip formed with protrusions.

4. A method according to claim 1 in which the tread applied to the track is in the form of a pair of parallel spaced rings of rubber comprising protuberances, the treaded rings being joined by a flat strip.

5. A method according to claim 1 in which the tread applied to the track is in the form of a pair of parallel spaced rings of rubber comprising protuberances and a circumferential band of material is placed externally around a partially hollowed centre area of the buffed worn track.

6. A method according to claim 1 in which the holding ring is circular.

7. A method according to claim 6 in which the holding ring is a buffed surface of a lorry tire whose outer circumference is the same in length as the inner perimeter of the track.

8. A method according to claim 1 in which the said correspondingly shaped rings are formed of a flexible material.

9. A method according to claim 8 in which the flexible material is rubber.

10. A method according to claim 8 in which the rings are profiled so as to conform precisely to the spaces which they are to fill.

11. A method according to claim 1 in which the vulcanizing is performed under pressure in a pressure chamber.

12. A method according to claim 1 in which the track is placed circumferentially round a circular holding ring whose diameter is such that the track fits snugly round it with the lugs in contact with the surface of the holding ring so that the main body of the track is spaced from the surface of the holding ring by a distance equal to the length of the lugs.

13. A method according to claim 1 in which an airtight envelope of flexible material encloses the track area and contains means for extraction of air and other gases from the space between the holding ring and the envelope whereby a vacuum is formed.

14. A method according to claim 13 in which the means for extraction of air is a valve.

15. A method according to claim 1 in which the correspondingly shaped rings are disposed on either side of the row of lugs and have a cross-sectional shape such that they fill the spaces bounded by the track, the lugs, the holding ring and the envelope.

* * * * *